Patented Apr. 26, 1938

2,115,250

UNITED STATES PATENT OFFICE 2,115,250

ORGANIC NITROGEN BASES AND THEIR SALTS

Herman A. Bruson, Philadelphia, Pa., assignor to Röhm & Haas Company, Philadelphia, Pa.

No Drawing. Application May 28, 1936, Serial No. 82,183

11 Claims. (Cl. 260—99.12)

This invention relates to new amines and their salts and to the quaternary ammonium bases and salts derived from these amines. It also relates to a process for preparing these new compounds. It relates more particularly to the water-soluble salts and bases which have been found to be excellent wetting, emulsifying, dispersing and cleaning agents which may be generally classed as capillary active compounds.

The amines are those having the general structure

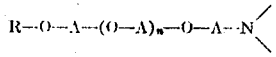

in which R is a hydrocarbon radical containing an aromatic nucleus at its point of attachment to the ether oxygen atom, A is an alkylene radical having more than one carbon atom, $n$ is equal to one (1) or zero (0), and N is the nitrogen atom derived from ammonia, a primary or secondary aliphatic, cycloaliphatic, arylaliphatic or hydroxyaliphatic amine or secondary heterocyclic amine.

These amines are readily prepared by condensing one mol. each of a monohydric phenol and a polyalkylene ether, having a halogen substituent on each of its terminal carbon atoms, in the presence of an alkaline condensing agent, reacting the product thus obtained with ammonia, a primary or secondary amine and treating the resulting amine hydrohalide with an alkali or alkaline earth hydroxide.

The reactions involved may be outlined as follows:

(1) R—OH+X—A—(O—A)$_n$—O—A—X+NaOH—→R—O—A(O—A)$_n$—O—A—X+NaX

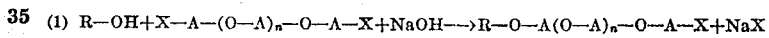

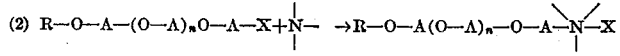

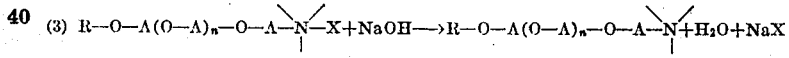

in which X is a halogen atom.

Quaternary ammonium salts corresponding to these amines may be made by treating a tertiary amine having as a substituent the radical

with an alkylating agent such as an alkyl chloride, dialkyl sulfate, aralkyl chloride, etc. Alternatively the quaternary ammonium salts may be obtained by treating a tertiary amine with the phenolic complex ether chloride. The bases may be obtained from these salts by treatment with caustic.

In preparing the complex ether halide as in Equation (1) a monohydric phenol is treated with at least an equimolecular quantity of a dihalogeno ether in which each of the halogen atoms is attached to a terminal methylene group, in the presence of at least an equimolecular proportion of an alkali hydroxide. This mixture is heated at about 100 to 140° C. until the reaction is complete. The time of heating may vary from two to more than fifteen hours, depending on the reactants. The temperature at which the reaction is carried out will also vary somewhat according to the actual materials involved. When the reaction is complete, the alkali halide is filtered off. The product is usually a liquid of relatively high boiling point which may be purified by distillation in vacuo.

In order to prepare the amine or quaternary ammonium salt this halogenated complex ether is heated with ammonia or the desired primary, secondary or tertiary amine until the reaction is complete. This usually requires from about one to fifteen or more hours at temperatures ranging from about 75 to about 180° C. depending on the nature and reactivity of the ingredients. The product is then treated with an alkali hydroxide to set free the base which may be separated from the aqueous solution and purified by distillation in vacuo. In many cases reaction products may be used directly since, as salts of the amines or of the quaternary ammonium bases, they are soluble in water. The free base may then be converted to a salt by treatment with an organic or inorganic acid such as, for example, acetic, formic, lactic, acrylic, propionic, crotonic, phosphoric, sulfuric, hydrochloric, etc. In case it is desired to convert the amine to a quaternary ammonium compound, it may be treated with an alkylating or aralkylating agent such as benzyl chloride, dimethyl sulfate, diethyl sulfate, dimethyl oxalate, methallyl chloride, methyl iodide, ethyl bromide, methyl thiocyanate, benzyl thiocyanate and other similar ones.

The phenols which can be used for the purpose of this invention include the following: Phenol, o-, m-, or p-cresol, thymol, carvacrol, p-ter-butylphenol, p-sec-butylphenol, p-ter-amylphenol, p-n-amylphenol, n-amyl-m-cresol, p-sec-octylphenol, p-ter-octylphenol, p-sec-hexylphenol, laurylphenol, o-, m-, or p-cylohexylphenol, o-, m-, or p-phenylphenol, o- or p-benzylphenol, α- or β-naphthol, ter-butyl-β-naphthol, ter-octyl-β-naphthol, 1,3,5-xylenol, and their obvious equivalents. The most useful products are those derived from p-alkylated phenols in which the alkyl group contains from 4 to 12 carbon atoms inclusive since these compounds show the highest degree of capillary activity. The alkyl group may be a straight or branched chain.

Among the dihalogeno-polyalkylene ethers which can be used may be mentioned β,β'-dichloro-diethyl ether, β,β'-dichloro-diisopropyl ether, dichloro-dibutylether, dichlorodiamyl ether, and the corresponding dibromo derivatives, β-chloroethyl-β'-chloroethoxyethyl ether, and their higher homologues containing up to 18 carbon atoms.

The compounds used for the amination of the monohalogenopolyalkylene ethers of the phenols used can be ammonia or primary, secondary and tertiary amines. Typical useful amines for the purpose are mono-, di-, or trimethylamine, mono-, di-, or triethylamine, or their higher homologues; monoethanolamine, diethanolamine, dibenzylamine, cyclohexylamine, dicyclohexylamine, piperidine, morpholine, benzyl-dimethylamine, and the like.

For practical purposes and in view of their cheapness, β,β'-dichlorodiethyl ether and β,β'-dichlor-diisopropyl ether are preferred for illustrating this invention in the following examples. The invention, however, is not limited to the exact conditions of time, temperature, concentration etc. shown nor to the exact ingredients as it may be otherwise practiced within the scope of the appended claims.

*Example 1*

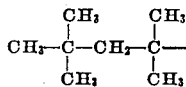

A mixture of 103 grams of p-(α,α,γ,γ-tetramethylbutyl) phenol, 22 grams of sodium hydroxide, 20 cc. of water and 286 grams of β,β'-dichlorodiethyl ether was heated under a reflux condenser at 115–120° C. for 6½ hours while stirring continuously. The sodium chloride formed was filtered off and the p-(α,α,γ,γ-tetramethylbutyl)phenoxyethoxy-ethyl chloride

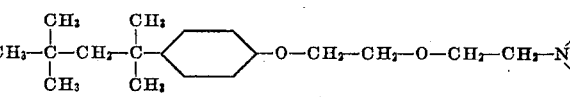

boiling at 177–178° C./4 mm. was isolated as a colorless oil by distillation of the filtrate in vacuo.

A mixture of 39 grams of the p-(α,α,γ,γ-tetramethylbutyl)-phenoxyethoxy-ethyl chloride thus obtained and 26 grams of diethanolamine was heated for 15½ hours on an oil bath at 120–135° C. under a reflux condenser while stirring. The thick brown oil obtained was mixed with 80 cc. of 10% caustic soda solution, 100 cc. of water and 150 cc. toluene and warmed for one-half hour on a water bath at 60–70° C. The toluene layer was then separated and washed with 100 cc. of water. After distillation of the toluene and fractionation of the residual oil in vacuo the p-(α,α,γ,γ-tetramethylbutyl)phenoxyethoxyethyl-diethanolamine was obtained as a pale yellow viscous oil in a yield of 82% of theory. It boiled at 255–260° C./5 mm.

This oil when dissolved in 10% phosphoric acid gave a clear solution which was very foamy, soapy, and lathery when shaken. Such solutions can be used for wetting out metal surfaces as in the cleaning of steel automobile bodies with phosphoric acid or for rustproofing steel with metal phosphate-phosphoric acid solutions.

*Example 2*

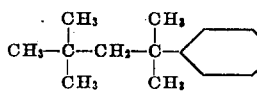 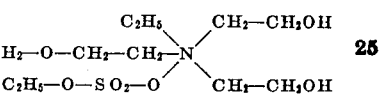

A solution of 30 grams of p-(α,α,γ,γ-tetramethylbutyl)phenoxyethoxyethyl - diethanolamine in 50 grams of toluene was mixed with a solution of 12.5 grams of diethyl sulfate in 25 grams of toluene, and the mixture heated for one hour at 80–85° C. The clear solution obtained was then evaporated under reduced pressure at 40–50° C. to remove the toluene. The residual quaternary ammonium compound was a viscous amber-colored oil which dissolved readily in water to give a clear, foamy, soapy solution, useful as a wetting-out agent and which was stable to hard water. The quaternary ammonium base can be liberated by treatment with alcoholic potassium hydroxide.

*Example 3*

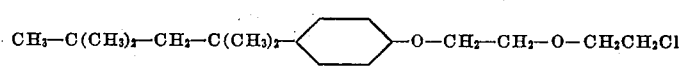 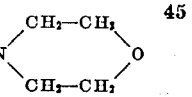

A mixture of 25 grams of morpholine and 62 grams of p-(α,α,γ,γ-tetramethylbutyl)phenoxyethoxy-ethyl chloride was heated under reflux for 7 hours at 100–120° C. The reaction mixture was made alkaline with caustic soda solution, and the oil layer separated and washed. Upon fractionating this oil in vacuo an 83% yield of p-(α,α,γ,γ-tetramethylbutyl) phenoxyethoxy-ethyl-N-morpholine was obtained as a pale yellow oil boiling at 203–208° C./4 mm.

It dissolved readily in 10% solutions of lactic, phosphoric, oxalic, or acetic acids, and these solutions gave heavy foams when shaken.

Upon treating 36 grams of p-(α,α,γ,γ-tetramethylbutyl)phenoxyethoxy-ethyl-N-morpholine with 16 grams of diethyl sulfate in toluene as described in Example 2, the corresponding compound

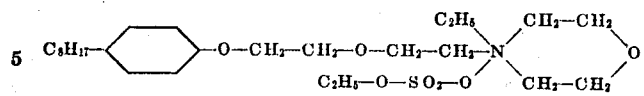

was obtained. It is a viscous, pale yellow mass which dissolves readily in water to give a foamy, soapy solution. The quaternary ammonium base can be liberated by treatment with alcoholic barium hydroxide solution.

*Example 4*

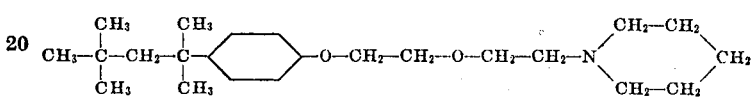

This compound was prepared by heating a mixture of 62.5 grams of p-(α,α,γ,γ-tetramethylbutyl)phenoxyethoxy-ethyl chloride with 17 grams of piperidine at 130–140° C. for 10 hours, liberating the base with caustic soda, and fractionating in vacuo, as described in Example 3. The compound was obtained in an 80% yield, as a yellow oil boiling at 185–200° C./1 mm., which upon cooling solidified to a waxy, crystalline mass.

It dissolved readily in 10% phosphoric acid to form a soap-like, foamy solution.

One molecular equivalent of the above amine in an equal volume of benzene was mixed with one molecular equivalent of benzyl chloride. The mixture was warmed 1 hour at 75° C. and the benzene distilled off under reduced pressure. The residue of p-(α,α,γ,γ-tetramethylbutyl)phenoxyethoxy-ethyl-N-benzyl-piperidinium chloride is useful as a spreader for insecticides. The quaternary ammonium base is liberated by treatment with alcoholic caustic soda solution.

*Example 5*

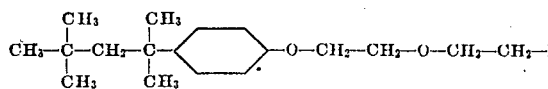

This compound was prepared by heating a mixture of 52 grams of p-(α,α,γ,γ-tetramethylbutyl)phenoxyethoxy-ethyl chloride with 25 grams of diethylamine under reflux for 9 hours on a boiling water bath. The base was liberated with dilute caustic soda solution. It separated as a yellowish oil boiling at 210–220° C./10 mm. Upon treatment with dimethyl sulfate it gave a water-soluble, soap-like body having the formula

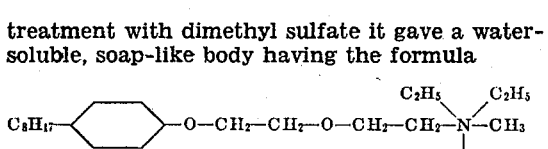

The analogous diamylamine derivative obtained from technical diamylamine and p-(α,α,γ,γ-tetramethylbutyl)phenoxyethoxy-ethyl chloride

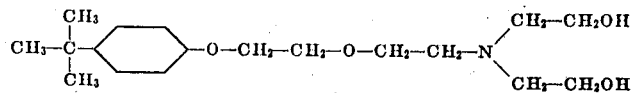

boiled at 220–240° C./6 mm. Its phosphate gave a very foamy solution in water.

*Example 6*

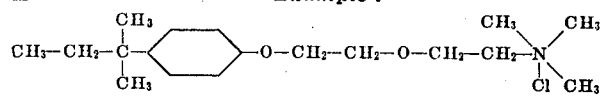

31 grams of diethanolamine was mixed with 51.5 grams of p-ter-butylphenoxyethoxy-ethyl chloride, a colorless oil boiling at 184–186° C./10 mm. which was prepared from p-ter-butylphenol, β,β'-dichlorodiethyl ether, and caustic soda, according to the procedure set forth in Example 1. The mixture was heated at 115–135° C. for 10 hours and then made alkaline with 90 cc. of 10% caustic soda solution. The p-ter-butylphenoxy-ethoxy-ethyl-diethanolamine separated as an oil which after washing and fractionating in vacuo is a pale yellow oil boiling at 265° C./10 mm. Yield 71% of theory.

The acetate, phosphate, and lactate of this base dissolve in water to give foamy solutions having low surface tensions. The quaternary ammonium compounds derived from the above base and diethyl sulfate, dimethyl sulfate, or benzyl chloride are water-soluble capillary active compounds.

*Example 7*

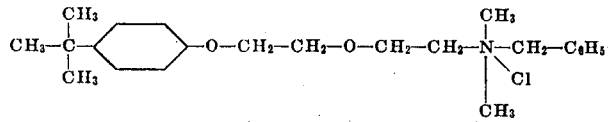

A mixture of 27 grams of p-ter-amylphenoxy-ethyl chloride and 13.8 grams of trimethylamine was heated in a sealed tube at 150–160° C. for 2 hours. The crystalline mass obtained after evaporation of the excess trimethylamine is the quaternary ammonium chloride having the above formula. Its aqueous solution yields a stable heavy foam and is useful for fixing direct dyestuffs on the fibre. Upon treatment with alcoholic potassium hydroxide the quaternary ammonium hydroxide is formed.

*Example 8*

A mixture of 20.8 grams of p-ter-butylphenoxyethoxy-ethyl chloride and 11 grams of benzyl dimethylamine was heated under a reflux condenser for 2 hours at 150° C. The clear, viscous mass obtained is the quaternary ammonium chloride having the above formula. Its aqueous solution is foamy and soap-like and may be used as a penetrating agent. The corresponding qua-

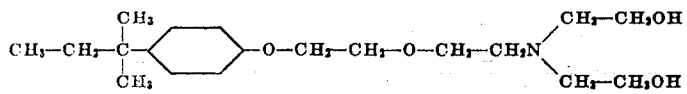

ternary ammonium hydroxide is formed by treatment with alcoholic sodium hydroxide solution.

*Example 9*

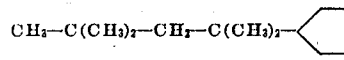

31 grams of diethanolamine was mixed with 54 grams of p-ter-amylphenoxyethoxy-ethyl chloride, a colorless oil boiling at 153–155° C./3 mm, which was prepared from p-ter-amyl phenol β,β'-dichlorodiethyl ether, and caustic soda, according to the procedure set forth in Example 1. The mixture was heated at 100–135° C. for 8 hours, then made alkaline, and the oil separated, washed and fractionated. The p-ter-amylphenoxyethoxyethyl-diethanolamine distilled at 240–245° C./4 mm. as a pale yellow oil. Its oxalate, lactate and phosphate are readily soluble in water to give foamy, soapy solutions useful as penetrating agents.

Upon condensing the above amine with a molecularly equivalent quantity of diethyl sulfate as described in Example 2, the p-ter-amylphenoxyethoxyethyl-dihydroxydiethyl-ethyl ammonium sulfuric ethyl ester.

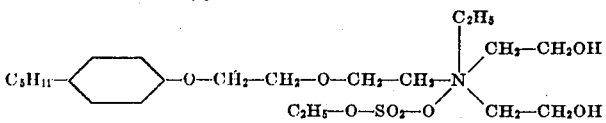

was obtained as a pale yellow oil. Its aqueous solution is suitable as a wetting-out agent for cotton yarn.

*Example 10*

A mixture of 1 mol. equivalent of α,α,γ,γ-tetramethylbutylphenoxyethoxy-ethyl chloride and 2 mols (excess) of dimethylamine was heated in an autoclave 5 hours at 180° C. The reaction mass was made alkaline with caustic soda solution and the free base isolated by distillation in vacuo after removal of unreacted dimetylamine. It was a colorless oil boiling at 191–194° C./3 mm.

This oil was heated with a molecularly equivalent quantity of diethyl sulfate in dry benzene on a water bath for 1 hour. Upon evaporation of the solvent, the ter-octylphenoxyethoxyethyl-dimethylethyl ammonium ethyl sulfate was left as a thick syrup. Its aqueous solution possesses a soap-like character and is useful for fixing acid dyes on the fibre.

*Example 11*

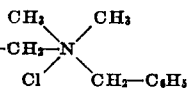

A mixture of 32 grams of p-(α,α,γ,γ-tetramethylbutyl) phenoxyethoxy - ethyl-dimethylamine and 12.7 parts of benzyl chloride was warmed to 50° C. with 50 grams of benzene for 2 hours. The benzene was then evaporated. The residual viscous mass gave a foamy, soapy solution in water.

*Example 12*

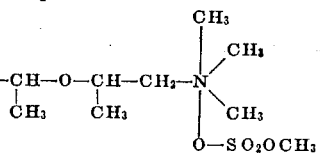

A mixture of 51.5 grams of p-(α,α,γ,γ-tetramethylbutyl) phenol, 11.7 grams of sodium hydroxide, 22 cc. of water and 171 grams of β,β'-dichloro-diisopropyl ether was heated at 110–120° C. with rapid agitation under a reflux condenser for 9 hours. The product was worked up as in Example 1, yielding 50 grams of ter-octylphenoxyisopropoxy-isopropyl chloride. (Colorless oil B. P. 190–195° C./5 mm.)

This oil was converted to the tertiary amine salt by heating it with excess of dimethylamine at 130–140° C. in an autoclave for 2 hours. The product was treated with excess caustic soda solution and the free base isolated by distillation under reduced pressure. It formed a colorless oil boiling at 195–200° C./3 mm. Yield 70% of theory.

Upon treatment of this base with one molecular equivalent of dimethyl sulfate, the water-

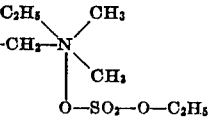

soluble quaternary ammonium salt was obtained having cation active properties. It readily combines with Congo red dye to form an insoluble lake and is useful for improving the fastness to washing of direct dyes.

*Example 13*

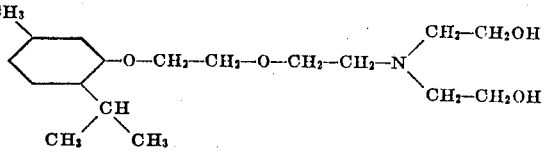

41.5 grams of diethanolamine was mixed with 51.5 grams of thymoxyethoxy-ethyl chloride, a colorless oil boiling at 176–178° C./10 mm., which was prepared from thymol, caustic soda and β,β'-dichlorodiethyl ether, according to the procedure set forth in Example 1. The mixture was heated 15 hours at 110–130° C., then made alkaline; and the base which separated as an oil was washed and fractionated in vacuo. The thymoxyethoxy-ethyl-diethanolamine distilled at 233–236° C./5 mm. as a pale yellow oil. Yield 72% of theory.

Its phosphoric acid salt dissolved readily in water to give a foamy solution useful as a wetting agent.

The analogous derivative obtained from xylenoxy-ethoxy-ethyl chloride, a colorless oil boiling at 168° C./10 mm. which was prepared from 1,3,5-xylenol, caustic soda and β,β'-dichlorodiethyl ether according to the procedure set forth in Example 1, and diethanolamine, was a pale yellow oil boiling at 252° C./10 mm., the hydrochloride of which possesses capillary active properties.

Example 14

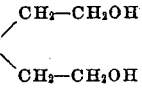

A mixture of 12.3 grams of α,α,γ,γ-tetramethylbutylphenol, 2.7 grams of caustic soda, 5 cc. of water and 64 grams of β-chloroethyl-β'-chloroethoxyethyl ether, a colorless oil boiling at 235° C., prepared by treating triethylene glycol in dimethylaniline with thionyl chloride, was heated 5 hours at 110–115° C. while stirring under a reflux condenser. The water was then distilled off, the sodium chloride removed by filtration and the clear filtrate fractionated. The β(ter-octylphenoxyethoxy) ethyl-β'-chloroethyl ether distilled as a colorless oil at 199–207° C./3 mm. This was mixed with a molecularly equivalent quantity of diethanolamine and heated 8 hours at 120° C. The base was then liberated by treatment with caustic soda. Its phosphate dissolves readily in water to give a foamy, soapy solution. Upon treatment with diethyl sulfate the water-soluble quaternary ammonium derivative is formed. Its aqueous solution is useful as a wetting-out agent.

In place of the diethanolamine, one can use diethylamine, piperidine, morpholine, dicyclohexylamine or dibenzylamine in the above condensation to obtain the analogous tertiary amines. The water-soluble phosphates, lactates, acetates, and quaternary ammonium salts of these phenol ethers are likewise useful as capillary active compounds.

Example 15

A mixture of 55 grams of p-ter-amylphenoxyethoxy ethyl chloride and 7 grams of anhydrous ammonia was heated in an autoclave for three hours at 160–180° C. The reaction product was then boiled under reflux with excess 10% caustic soda solution, and the oil separated and distilled. It boiled over a range of 170–240° C./3 mm., and represents a mixture of primary, secondary and tertiary amines in which all the substituent groups are derived from the complex ether chloride.

In a similar manner the following bases were prepared from the arylpolyether chlorides and amines tabulated below.

| | With diethanolamine and | Product obtained |
|---|---|---|
| | β(β-Naphthoxy)ethyl-β'-chloroethyl ether (from β-naphthol) B. P. 215–216°/10 mm. | β-Naphthoxyethoxyethyl-diethanolamine Oil. B. P. 275–280°/7 mm. |
| | β-(o-Benzylphenoxy)ethyl-β'-chloroethyl ether (from o-benzyl phenol) B. P. 230–233°/10 mm. | o-Benzylphenoxyethoxyethyl-diethanolamine Oil. B. P. 280–285°/6 mm. |
| | β-(o-Cyclohexylphenoxy)ethyl-β'-chloroethyl ether (from o-cyclohexylphenol) B. P. 206–209°/10 mm. | o - Cyclohexylphenoxyethoxyethyl - diethanolamine Oil. B. P. 262°/6 mm. |
| | β-(p-Cyclohexylphenoxy)ethyl-β'-chloroethyl ether (from p-cyclohexylphenol) B. P. 218–220°/10 mm. | p - Cyclohexylphenoxyethoxyethyl - diethanolamine Oil. B. P. 280–285°/8 mm. |
| | β(o-Phenylphenoxy)ethyl-β'-chloroethyl ether (from o-phenylphenol) B. P. 211–212°/10 mm. | o-Phenylphenoxyethoxyethyl-diethanolamine Oil. B. P. 275–280°/10 mm. |
| | β(p-Phenylphenoxy)ethyl-β'-chloroethyl ether (from p-phenylphenol) B. P. 185–189°/0.5 mm. M. P. 51° | p-Phenylphenoxyethoxyethyl-diethanolamine. (Resinous mass) |
| | With Dibenzylamine and | |
| | β-(p-α,α,γ,γ-Tetramethylbutylphenoxy)ethyl-β'-chloroethyl ether (from p-α,α,γ,γ-tetramethylbutylphenol) B. P. 177–178°/4 mm. | p - Ter - octylphenoxyethoxyethyl-N - dibenzylamine (Waxy crystals) |

The water-soluble pentavalent N-derivatives of the above bases notably their lactates, phosphates, acetates and the quaternary ammonium salts obtained with benzyl chloride, diethyl sulfate, or dimethyl sulfate are likewise useful as capillary active agents.

Among the uses suggested for such capillary active compounds is their employment as textile assistants in dyeing, bleaching, mercerizing and mordanting operations; as spreaders for insecticides, dispersing agents for pigments, as wetting and penetrating agents, pickling inhibitors, and assistants in leather tanning and finishing operations. The water-soluble quaternary ammonium salts of the type herein set forth are particularly useful for rendering dyeings with acid, direct, or chrome dyestuffs on rayon, cotton, or on cellulose esters or ethers, faster to light and washings. For this purpose the textile is treated with a solution of the capillary active compound and subsequently dyed in the usual manner.

The quaternary ammonium hydroxides are useful as capillary active compounds in alkaline solution and may be used as mercerizing assistants.

I claim:

1. A compound of the formula $$CH_3-\underset{\underset{CH}{|}}{\overset{\overset{CH_3}{|}}{C}}-\langle\phantom{O}\rangle-O-CH_2-CH_2-O-CH_2-CH_2-\underset{\underset{Cl}{|}}{\overset{\overset{CH_3}{|}}{N}}{\overset{CH_3}{\diagdown}}-CH_2-C_6H_5$$

2. A compound of the formula $$CH_3-CH_2-\underset{\underset{CH_3}{|}}{\overset{\overset{CH_3}{|}}{C}}-\langle\phantom{O}\rangle-O-CH_2-CH_2-O-CH_2-CH_2-\underset{\underset{Cl}{|}}{\overset{\overset{CH_3}{|}}{N}}{\overset{CH_3}{\diagdown}}{\underset{CH_3}{\diagdown}}$$

3. A compound of the formula $$CH_3-\underset{\underset{CH_3}{|}}{\overset{\overset{CH_3}{|}}{C}}-CH_2-\underset{\underset{CH_3}{|}}{\overset{\overset{CH_3}{|}}{C}}-\langle\phantom{O}\rangle-O-CH_2-CH_2-O-CH_2-CH_2-\underset{\underset{O}{|}\atop C_2H_5-O-S O_2}{\overset{\overset{C_2H_5}{|}}{N}}{\overset{CH_2-CH_2OH}{\diagdown}\atop\diagdown CH_2-CH_2OH}$$

4. A compound of the formula $$X-\langle\phantom{O}\rangle-O-CH_2-CH_2-O-CH_2-CH_2-\overset{a\phantom{-}b}{\underset{d\phantom{-}c}{N}}$$

in which X is an alkyl radical, $a$, $b$, and $c$ are members of the group consisting of alkyl, hydroxy alkyl, aralkyl and cycloalkyl radicals, and $d$ is an anion.

5. A compound of the formula $$X-\langle\phantom{O}\rangle-(O-CH_2-CH)_n-O-CH_2CH_2-\overset{a\phantom{-}b}{\underset{d\phantom{-}c}{N}}$$

in which X is an alkyl radical, $a$, $b$, and $c$ are members of the group consisting of alkyl, hydroxyalkyl, aralkyl, and cycloalkyl radicals, $d$ is an anion, and $n$ is an integer less than 3.

6. A compound of the formula $$X-\langle\phantom{O}\rangle-(-O-CH_2-CH_2)_n-O-CH_2-CH_2-\overset{a\phantom{-}b}{\underset{d\phantom{-}c}{N}}$$

in which X is an alkyl radical, $a$, $b$, and $c$ are members of the group consisting of alkyl, hydroxyalkyl, aralkyl, and cycloalkyl radicals, $d$ is an anion, and $n$ is an integer less than 3.

7. A compound of the formula $$X-R-(-O-CH_2-CH_2)_n-O-CH_2-CH_2-\overset{a\phantom{-}b}{\underset{d\phantom{-}c}{N}}$$

in which X is an alkyl radical, R is one of the group consisting of benzene and naphthalene nuclei, $a$, $b$, and $c$ are members of the group consisting of alkyl, hydroxyalkyl, aralkyl and cycloalkyl radicals, $d$ is an anion, and $n$ is an integer less than 3.

8. A compound of the formula $$X-R-(-O-A)_n-O-A-\overset{a\phantom{-}b}{\underset{d\phantom{-}c}{N}}$$

in which X is an alkyl radical, R is an aromatic nucleus of the benzene and naphthalene series, A represents an alkylene radical containing more than one carbon atom, and $a$, $b$, and $c$ are members of the group consisting of alkyl, hydroxy- alkyl, aralkyl and cycloalkyl radicals, $d$ is an anion, and $n$ is an integer less than 3.

9. A compound of the formula $$R-(-O-A)_n-O-A-\overset{a\phantom{-}b}{\underset{d\phantom{-}c}{N}}$$

in which R is an aromatic hydrocarbon radical of the benzene and naphthalene series nuclearly connected to the ether oxygen atom, A represents an alkylene radical having more than one carbon atom, and $a$, $b$, and $c$ are members of the group consisting of alkyl, hydroxyalkyl, aralkyl, and cycloalkyl radicals, $d$ is an anion, and $n$ is an integer less than 3.

10. A compound of the formula $$R-(-O-A)_n-O-A-\overset{a\phantom{-}b}{\underset{d\phantom{-}c}{N}}$$

in which R is a hydrocarbon radical containing an aromatic nucleus of the benzene and naphthalene series nuclearly connected to the ether oxygen atom, A represents an alkylene group containing more than one carbon atom, $a$, $b$, and $c$ are members of the group consisting of alkyl, hydroxyalkyl, aralkyl, and cycloalkyl radicals, $d$ is an anion, and $n$ is an integer less than 3.

11. An ammonium compound of the formula $$R-(-O-A)_n-O-A-Z$$

in which R is a hydrocarbon radical containing an aromatic nucleus of the benzene and naphthalene series nuclearly connected to the ether oxygen atom, A is an alkylene group containing more than one carbon atom, $n$ is an integer less than 3, and Z is a nitrogen-containing radical of the group consisting of:

$$-\underset{\underset{H}{|}}{\overset{\overset{H}{|}}{N}}{\overset{H}{\diagdown}\atop\diagdown H} \quad -\underset{\underset{d}{|}}{\overset{\overset{H}{|}}{N}}{\overset{H}{\diagdown}\atop\diagdown c} \quad -\underset{\underset{d}{|}}{\overset{\overset{H}{|}}{N}}{\overset{b}{\diagdown}\atop\diagdown c} \quad -\underset{\underset{d}{|}}{\overset{\overset{a}{|}}{N}}{\overset{b}{\diagdown}\atop\diagdown c} \quad -\underset{\underset{d}{|}}{\overset{}{N}}=e \quad -\underset{\underset{d}{|}}{\overset{}{N}}=e$$

in which $a$, $b$, and $c$ are members of the group consisting of alkyl hydroxyalkyl, arakyl, and cycloalkyl radicals, $e$ is a saturated radical which forms with N a heterocyclic ring and $d$ is an anion.

HERMAN A. BRUSON.